United States Patent
Lakshman

(10) Patent No.: US 7,410,589 B2
(45) Date of Patent: Aug. 12, 2008

(54) HOG MANURE TREATMENT METHOD

(76) Inventor: Gurunathan Lakshman, 222-111 Research Drive, Saskatoon Saskatchewan (CA) S7N 3R2

( * ) Notice: Subject to any disclaimer, the term of this patent is extended or adjusted under 35 U.S.C. 154(b) by 7 days.

(21) Appl. No.: 10/522,407

(22) PCT Filed: Jul. 26, 2002

(86) PCT No.: PCT/CA02/01187

§ 371 (c)(1),
(2), (4) Date: Sep. 29, 2005

(87) PCT Pub. No.: WO2004/011393

PCT Pub. Date: Feb. 5, 2004

(65) Prior Publication Data

US 2006/0108291 A1 May 25, 2006

(51) Int. Cl.
*C02F 1/20* (2006.01)
*C02F 1/56* (2006.01)

(52) U.S. Cl. ............... 210/718; 71/21; 71/33; 210/725; 210/727; 210/903; 210/906; 210/916

(58) Field of Classification Search ............ 210/725
See application file for complete search history.

(56) References Cited

U.S. PATENT DOCUMENTS

| 4,670,158 | A | | 6/1987 | Kelly | |
|---|---|---|---|---|---|
| 5,531,907 | A | * | 7/1996 | Williams et al. | 210/727 |
| 5,914,040 | A | * | 6/1999 | Pescher et al. | 210/638 |
| 6,409,788 | B1 | * | 6/2002 | Sower | 71/11 |
| 6,824,691 | B2 | * | 11/2004 | Almela | 210/705 |
| 6,916,426 | B2 | * | 7/2005 | Van Slyke et al. | 210/666 |
| 7,005,072 | B2 | * | 2/2006 | Bowers et al. | 210/715 |
| 7,135,116 | B2 | * | 11/2006 | Haggerty | 210/632 |
| 7,182,872 | B2 | * | 2/2007 | Barak et al. | 210/638 |

FOREIGN PATENT DOCUMENTS

| DE | 44 44 032 C1 | 5/1996 |
|---|---|---|
| EP | 0 490 396 | 6/1992 |
| EP | 0 530 826 | 3/1993 |
| EP | 1 041 058 | 10/2000 |

* cited by examiner

*Primary Examiner*—Peter A. Hruskoci
(74) *Attorney, Agent, or Firm*—Michael R. Williams; Ryan W. Dupuis; Adrian D. Battison

(57) ABSTRACT

The invention relates to a method of treating manure such that odor from the manure is significantly reduced or eliminated and producing therefrom recyclable water, value-added biosolids and ammonia. Specifically, the manure is combined with lime at high pH. The material is mixed under negative pressure and the basic conditions cause ammonia to be evolved from the manure which is then drawn off and recovered. A coagulating agent is then added which further promotes floc formation within the manure. Following further mixing, flocs are separated from the liquid portion. A struvite-promoting chemical and a coagulant are then added to the liquid portion which causes further floc formation, and the flocs are again separated from the substantially clear liquid. It is of note that as a result of this process, the solids are highly hydrophobic and dry very quickly. It is of further note that solids isolated from either step can be combined and sold, for example, as fertilizer, as discussed below. The clear liquid can be used, for example, in barn washes or for horticultural watering.

7 Claims, 2 Drawing Sheets

US 7,410,589 B2

HOG MANURE TREATMENT METHOD

PRIOR APPLICATION INFORMATION

This application is the National Stage of International Application No. PCT/CA02/01187, filed Jul. 26, 2002.

FIELD OF THE INVENTION

The present invention relates generally to the field of waste treatment. More specifically, the present invention relates to a system and a method for treating manure.

BACKGROUND OF THE INVENTION

According to municipalities, government agencies, environmentalists and the public in general, odour and potential pollution sources emanating from livestock, for example, hog, dairy, feedlot and chicken, facilities are the main issues that the livestock industry needs to address in order to sustain its development. The most intense source of odour from livestock facilities occurs during manure handling and land application.

U.S. Pat. No. 1,915,240 teaches a sewage purification method which comprises mixing lime and ferric chloride with raw sewage, which deodorizes the waste and causes floc formation. The floc is then oxidized and sterilized before being allowed to settle for subsequent removal and dewatering.

U.S. Pat. Nos. 3,619,420 and 3,640,820 teach a sewage treatment process wherein treated sludge is converted to an active substance by heat treatment and returned to the sewage treatment tank, thereby improving the operational efficiency of the method.

U.S. Pat. No. 4,309,291 teaches a method of continuous flow flocculation and clarification wherein waste water is flocculated by subjecting the mixture to continuous, turbulent flow to and from a settling tank. Clarified effluent and settled flocculent are continuously discharged from the settling tank.

U.S. Pat. No. 4,111,800 teaches a process for treating municipal solid waste and raw sewage sludge wherein municipal waste is mixed with cellulose-containing solid waste.

U.S. Pat. No. 4,180,459 teaches a process of making agricultural products from organic sewage sludge comprising treating sewage sludge with $FeCl_3$ and $CaO$ from various sources, preferably from sugar refining for flocculation. It is of note that the sewage sludge is characterized as "acidic conditioned sludge" having a pH of between 3.0-5.7.

U.S. Pat. No. 4,209,393 teaches using coal as a sewage sludge additive rather than activated carbon.

U.S. Pat. No. 4,212,732 teaches a raw liquid waste treatment process wherein ash and activated carbon are added to raw sewage to promote settling of flocculent.

U.S. Pat. No. 4,670,158 teaches a method of wastewater treatment wherein lime and phosphoric acid are added to wastewater to promote flocculation. In this method, the pH of the wastewater is adjusted to be within 7.0-10.0, preferably 8.5-9.0 with phosphoric acid.

U.S. Pat. No. 5,698,110 teaches a deodorizing composition for treating animal waste comprising a mixture of lime and cellulose so that the waste can subsequently be used as fertilizer.

U.S. Pat. No. 5,897,785 teaches a process for treating animal waste wherein waste is diluted with water and exposed to radiation to eliminate pathogens. High charge, cationic polymers are then added to the waste such that polymerized solids are formed which are then separated from the waste.

U.S. Pat. No. 5,958,758 teaches a process for treating animal waste wherein sulfide-utilizing bacteria are added to the waste followed by the addition of organic digesting bacteria and lytic enzymes.

U.S. Pat. No. 6,033,570 teaches a process for the treatment of liquid hog manure in which cellulosic material is added to promote removal of solids from the liquid.

U.S. Pat. Nos. 6,039,875 and 6,214,230 teach the use of bacterially-generated polymers as coagulants for the removal of suspended solids from wastewater.

SUMMARY OF THE INVENTION

According to a first aspect of the invention, there is provided a method of treating manure comprising:

a) mixing a quantity of manure with lime such that said mixture has a basic pH;

b) adding a first coagulating polymer to said mixture, thereby promoting floc formation within said mixture;

c) separating the floc from the mixture, thereby forming solids and a liquid portion;

d) adding a second coagulating polymer and/or a struvite-promoting compound to said liquid portion, thereby forming solids and clear liquid; and e) separating the clear liquid from the solids.

According to a second aspect of the invention, there is provided the use of SUPERFLOC as a coagulant in manure treatment.

According to a third aspect of the invention, there is provided a composition for promoting struvite formation comprising a struvite promoting compound and a coagulating polymer.

According to a fourth aspect of the invention, there is provided a method of promoting struvite formation comprising:

providing a quantity of liquid containing dissolved phosphorous;

adding a struvite promoting compound and a coagulating polymer to said liquid, thereby forming a mixture;

mixing said mixture, thereby promoting struvite formation;

allowing said mixture to stand, thereby separating said mixture into struvite and clear liquid; and separating the struvite and the clear liquid.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a method or process of treating manure comprising:

a) mixing a quantity of manure with lime such that said mixture has a basic pH;

b) adding a first coagulant to said mixture, thereby promoting floc formation within said mixture;

c) separating the floc from the mixture, thereby forming solids and a liquid portion;

d) adding a second coagulant and a struvite-promoting compound to said liquid portion, thereby forming solids and clear liquid; and e) separating the clear liquid from the solids.

The invention relates to a method of and a process for treating manure such that odour from the manure is significantly reduced or eliminated and producing therefrom recyclable water, value-added biosolids and ammonia. Specifically, the manure is combined with lime, resulting in a mixture having a basic pH. The basic conditions cause gases, for example, ammonia to be evolved from the manure, so the mixture is mixed under negative pressure and the gases are drawn off and recovered, as described below As a result of this treatment, the manure is deodorized and sterilized as pathogens are unable to survive at the high pH. A coagulating agent is then added which further promotes floc formation within the manure. Following further mixing, the flocs are separated from the liquid portion. A struvite-promoting chemical and a coagulant are then added to the liquid portion which causes further floc formation, and the flocs are again separated from the now substantially clear liquid. It is of note that as a result of this process, the solids are highly hydrophobic and dry very quickly. It is of further note that solids isolated from either step can be combined and used, for example, as fertilizer, as discussed below. The clear liquid can be used, for example, for barn washing or for horticultural watering.

The invention will now be described in detail by examples, although the invention is not limited to the examples.

In the exemplary examples, the manure is hog manure. However, as will be appreciated by one knowledgeable in the art, other types of manure, for example, manure from dairy or feedlot animals or chickens as well as, for example, septage from sewage holding tanks or effluent from rendering (abattoir) plants, may also be used in the invention.

Figure 1:
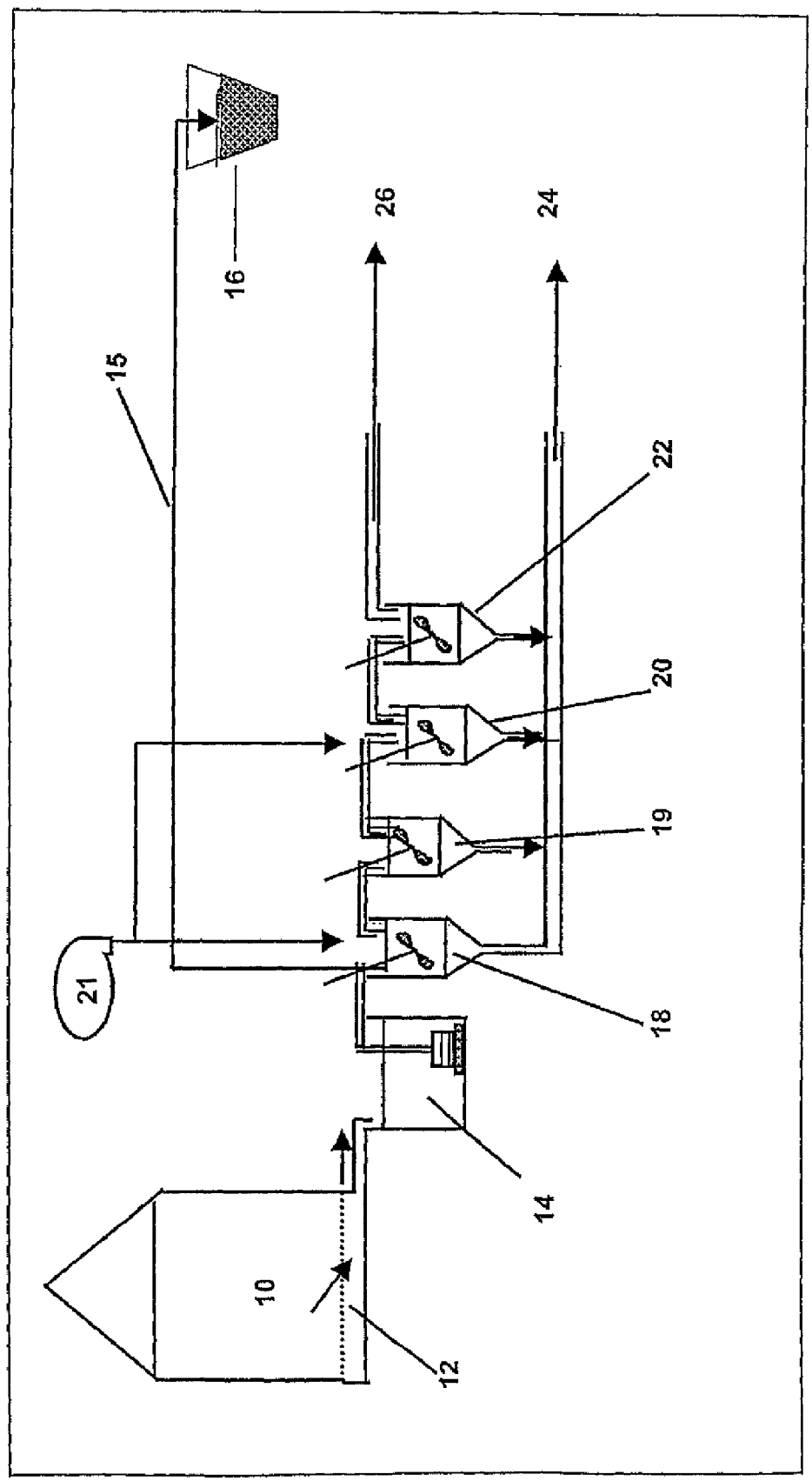
FIG. 1 shows a schematic drawing of the method.

Referring to FIG. 1, manure from a barn 10 is collected, for example, in a manure pit 12 beneath the barn 10 and is transferred to a holding tank 14. Lime, for example, hydrated lime or unhydrated lime ($Ca(OH)_2$) is added to the manure and the manure is mixed vigorously (for example, 100 rpm) for several hours, in some embodiments, 10-12 hours, although other suitable time periods may be used according to the conditions of the manure and desired results. In some embodiments, lime is added at dosing rates ranging from less than 5 g/l to about 20 g/l. As a result of the addition of the lime, the pH in the manure is raised to above 11.0, more preferably to above 11.5 and yet more preferably to 12.0-12.5. This in turn causes small flocs to develop within the manure and also volatilizes gases, for example, ammonia within the manure. It is of note that some of the other dissolved gases, for example, skatoles and mercaptans, may also be volatilized in smaller quantities. In some embodiments, the holding tank 14 is kept under negative pressure and evolved gases are removed from the holding tank 14. Specifically, the gases are removed via pipes 15 and then bubbled through low pH water 16. As will be apparent to one knowledgeable in the art, the ammonia readily dissolves into the water and is thereby recovered.

It is of note that in some embodiments, NaOH or other suitable chemicals may be added first to raise the pH followed by the addition of $Ca(OH)_2$ to generate flocs.

Thus, addition of the lime at a high pH both deodorizes and sterilizes the manure, as pathogens are unable to survive at the high pH. Furthermore, as discussed above, the addition of the lime results in some floc formation.

The manure mixture is then transferred to a first reaction tank 18 wherein the mixing speed is reduced to less than 20 rpm and a first coagulating agent is added. In one embodiment, the first coagulating agent is a flocculating or coagulating polymer known in the art, of anionic, cationic or nonionic type, or a combination of such polymers and polyacrylamides. These coagulating and flocculating agents known in the art are currently used in the flocculation of sewage and other industrial and agricultural effluents. Many of these agents are polymers and/or inorganic chemicals. As will be appreciated by one knowledgeable in the art, examples of coagulating polymers include but are by no means limited to, for example SUPERFLOC™ Flocculant (cationic polyacrylamide), manufactured by CYTEC, WEB-3 or WEB1500. It is of note that other suitable coagulants may also be used. The polymer may be added in a gentle stream, as shown at 21 in FIGS. 1 and 2. As will be apparent to one knowledgeable in the art, SUPERFLOC™ Flocculant (cationic polyacrylamide) is viscous and addition thereof must be controlled for optimal results. However, other suitable means known in the art of adding the coagulating agent so that good mixing within the manure mixture is obtained may also be used. As will be appreciated by one knowledgeable in the art, SUPERFLOC™ Flocculant (cationic polyacrylamide)-dosage is determined by the chemical characteristics of the manure to be treated. In some embodiments, the dosing rates can vary from 2 ml per liter to more than 10 ml per liter. SUPERFLOC™ Flocculant (cationic polyacrylamide) is a solution of SUPERFLOC™ Flocculant (cationic polyacrylamide) powder in water. It is preferably a 0.25% to 1% solution of SUPERFLOC™ Flocculant (cationic polyacrylamide) powder in water. Producing a solution of higher concentration may be limited by the high viscosity of the resulting product.

The manure is mixed at the low mixing speed until large flocs develop and the manure slurry increases in viscosity, in some embodiments, for 10-15 minutes. Specifically, the slurry is mixed until flocs become stable and a layer of clear liquid begins to form at the top. At this point, the slurry is allowed to settle into solids and a liquid portion. In some embodiments, the slurry may be transferred to a settling tank 19, as shown in FIG. 1.

Figure 2:
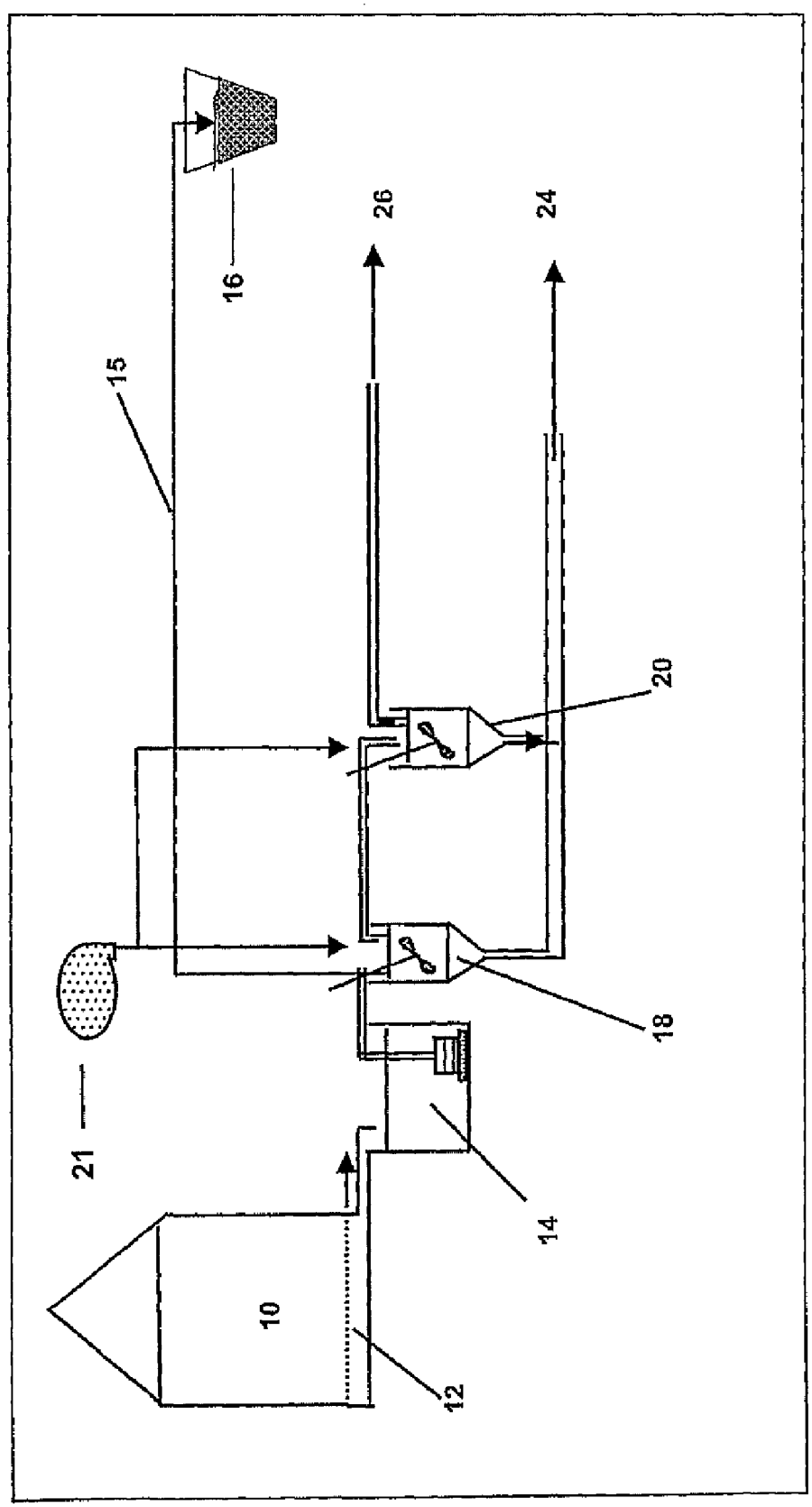
FIG. 2 shows a schematic drawing of an alternate embodiment of the method.

As can be seen in FIGS. 1 and 2, settleable solids may be removed from the bottom of the reaction and settling tanks, as discussed below.

The slurry is then passed through a screening device to separate the solids from the liquid portion. Specifically, the solids are removed and/or separated in a mechanical/settling process and the liquid is decanted to the second reaction tank 20. The liquid portion resulting from this stage of treatment is turbid but mostly devoid of any settleable solids fraction and is passed to the second reaction tank.

The liquid portion in the second reaction tank 20 is mixed with a struvite-promoting compound, for example, $MgCl_2$, $MgSO_4$, $MgCO_3$ or magnesium oxide or a coagulant polymer as described above, or combinations thereof. In one embodiment, $MgCl_2$, either as a hydrate ($MgCl_2:6\ H_2O$) or in the anhydrous form is added. At this stage, a second coagulant is also added. In some embodiments, the second coagulant is SUPERFLOC™ Flocculant (cationic polyacrylamide), which is again-added in a gentle stream, as discussed above. It is of note that in addition to or in place of SUPERFLOC, other coagulants may also be used. These include coagulant and flocculant agents known in the art and currently used in the flocculation of sewage and other industrial and agricultural effluents. Many of these agents are polymers and/or inorganic chemicals. When $MgCl_2$, in some embodiments, at 1 g per liter to 10 g per liter depending upon the chemical characteristics of the manure, and SUPERFLOC™ Flocculant (cationic polyacrylamide), in some embodiments, at less than 2 ml per liter to more than 10 ml per liter depending upon the chemical characteristics of the manure, are added to this liquid with continuous mixing, large flocs begin to form due to the formation of struvite, a magnesium-phosphorous compound, which is highly insoluble in water. Thus, this combination of coagulant and struvite-promoting compound has the surprising effect of promoting floc formation to a great extent so that the flocs begin to get denser and precipitate to the bottom. After standing, the liquid portion is again passed through a screening device to separate the settled solids from the liquid portion. Specifically, the solids are removed and/or separated in a mechanical/settling process and the liquid is decanted to the next tank. It is of note that a clear liquid is obtained from this stage of treatment. It is also of note that the liquid may be treated a second time with the struvite-promoting compound(s) as described above, and as shown in FIG. 1 wherein the third reaction tank is shown as 22. As will be appreciated by one of skill in the art, the necessity of this additional step will depend on the effluent being treated.

The solids from the tanks are collected and spread to dry, as shown generally in FIGS. 1 and 2 as 24. As discussed above, as a result of treatment, the solids develop a hydrophobic tendency and allow the water to drain away naturally leaving dry solids behind. Furthermore, the solids dry very quickly as a result of this hydrophobicity.

The dried solids can be used as, for example, fertilizer. It is also of note that the dried solids have high heating value (calorific value), equal to or higher than the calorific value of lignite coal. As a consequence, the solids may be used as a heating fuel in boilers or furnaces. It is of note that, as discussed above, as a result of the process, the solids dry quickly and are substantially odor-free and pathogen-free.

The liquid portion is removed from the last tank, shown generally at 26 and can be used for example, for horticultural watering, for example, crops or trees, or for barn washing. It is of note that following treatment by the process, the liquid portion is ready for immediate use and does not require further settling or treatment. However, depending on the effluent, in some embodiments, the liquid may be pumped through a filter media, for example, activated carbon, sand or a combination thereof in a tank.

It is of note that in the process described above, the dosing techniques used to add the reactants may include in-line injection, spraying, atomizing or any other type of method used for chemical injection known in the art. It is of note that the reactants may be added separately or may be mixed prior to injection.

As will be appreciated, the operating configuration of the treatment process as shown in FIG. 1 is for illustrative purposes only. It is of note that many modifications and variations are possible to suit site-specific requirements. For example, the number of tanks and the related hardware may be modified. Thus, the invention is not restricted to the operation shown in the figures. It is also of note that the treatment process can be operated without the second stage of treatment for producing recyclable, clear water. It is of further note that the two stages can be repeated either individually or in various combinations to provide the desired or required final product.

While the preferred embodiments of the invention have been described above, it will be recognized and understood that various modifications may be made therein, and the appended claims are intended to cover all such modifications which may fall within the spirit and scope of the invention.

The invention claimed is:

1. A method of treating manure comprising:
  a) mixing a quantity of manure with lime such that said mixture has a pH above 11.0 and ammonia is volatilized within said mixture;
  b) removing ammonia volatilized from said mixture during mixing, thereby producing deodorized and sterilized manure;
  c) adding a cationic, anionic or non-ionic flocculating or coagulating polymer to said deodorized and sterilized manure, thereby producing a slurry comprising a solid portion including flocs and a liquid portion;
  d) separating the solid portion from the liquid portion of the slurry;
  e) adding $MgCl_2$, $MgSO_4$, $MgCO_3$ or magnesium and a cationic, anionic, or non-ionic flocculating or coagulating polymer to said liquid portion, thereby promoting formation of flocs and struvite within the liquid portion; and
  f) separating the struvite-containing flocs from the liquid portion.

2. The method according to claim 1 wherein the manure is selected from the group consisting of hog manure, feedlot manure, dairy cow manure and chicken manure.

3. The method according to claim 1 wherein the pH is above 11.5.

4. The method according to claim 1 wherein the pH is between 11.5-12.5.

5. The method according to claim 1 wherein the lime and manure is mixed vigorously for several hours.

6. The method according to claim 1 wherein evolved gases from step (b) are removed under negative pressure.

7. The method according to claim 1 wherein in step (d), the solid portion including flocs is separated from the liquid portion of the slurry by mixing the slurry until the floc portion becomes stable and a layer of clear liquid begins to form at the top of the slurry.

* * * * *